Patented May 15, 1923.

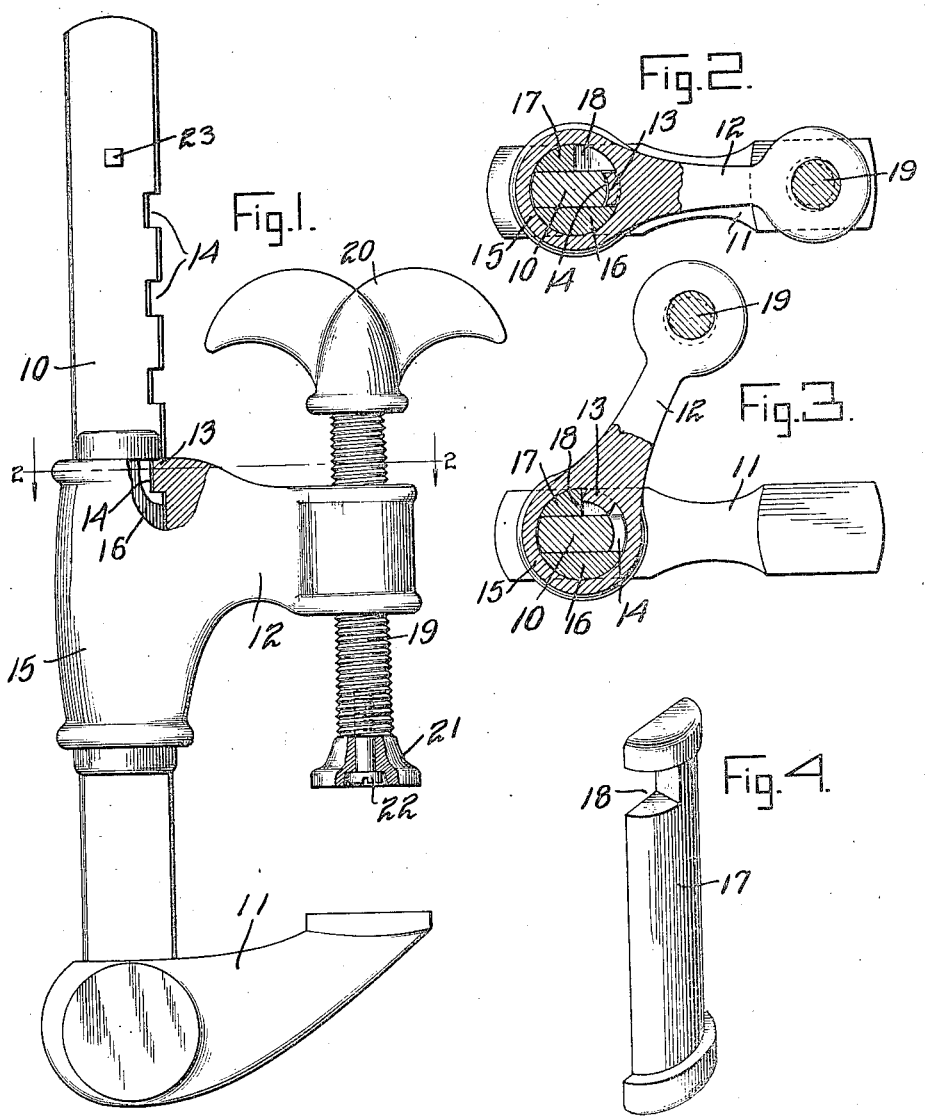

1,455,709

UNITED STATES PATENT OFFICE.

RALPH BURBANK, OF MEMPHIS, TENNESSEE.

CLAMP.

Application filed December 20, 1921. Serial No. 523,725.

*To all whom it may concern:*

Be it known that I, RALPH BURBANK, a citizen of the United States, residing at Memphis, in the county of Shelby and State of Tennessee, have invented certain new and useful Improvements in Clamps, of which the following is a specification.

My said invention relates to a clamp of the quickly detachable type and it is an object of the same to provide a clamp the movable jaw of which may be moved quickly to and from approximately closed position and which has a fine adjustment in addition to the coarse adjustment afforded by the movement above referred to.

A further object of the invention is to provide a device which shall have few and simple parts and therefore be inexpensive to manufacture.

Referring to the accompanying drawings which are made a part hereof and on which similar reference characters indicate similar parts, Figure 1 is a plan of my device, Figure 2 is a section on line 2—2 of Figure 1, Figure 3 a similar section with the parts differently positioned, and Figure 4 a detail in perspective.

In the drawings 10 indicates the shank of the tool having a fixed jaw 11 at one end thereof. A movable jaw 12 is provided with a tooth 13 adapted to engage any one of a series of notches 14 in the shank of the tool. The movable jaw has a base 15 in which there is a cylindrical bore having a diameter to accommodate the shank 10. A pair of filler blocks 16 and 17 are arranged at opposite sides of the shank within said bore, the filler block 17 having a notch at 18 to receive the tooth 13 when disengaged from the shank, as illustrated in Figure 3. In this position the jaw may slide along the shank to the desired position after which the jaw is swung back to engage the tooth with the desired notch as illustrated in Figures 1 and 2.

After a rough adjustment has been made in the manner above described a further fine adjustment may be made. This is done by means of a screw 19 engaging a threaded opening in the jaw 12 and having at its rear end a handle 20 and at its front end a work engaging part 21 held in place by a screw 22.

To release the work the screw 19 will first be backed off and then the jaw may be swung sidewise and slid back along the shank, the rearward motion being limited by a stop 23.

It will be obvious to those skilled in the art that various changes may be made in the device without departing from the spirit of my invention as indicated in the appended claims.

Having thus fully described my said invention, what I claim as new and desire to secure by Letters Patent, is:

1. A clamp comprising a shank having notches, fixed and movable jaws thereon, said movable jaw having a tooth engageable selectively with said notches and the jaw being mounted for sidewise oscillation on the shank to move said tooth into and out of engagement with said notches, substantially as set forth.

2. A clamp comprising a shank having notches, fixed and movable jaws thereon, said movable jaw adapted for lateral oscillation and longitudinal sliding movement relative to said shank and having a tooth for selective engagement with said notches, substantially as set forth.

3. A clamp comprising a flat shank having notches along one edge, a fixed and a movable jaw on the shank said movable jaw having a cylindrical bore encircling said shank.

In witness whereof, I have hereunto set my hand and seal at Memphis, Tennessee this 7th day of December, A. D. nineteen hundred and twenty-one.

RALPH BURBANK. [L. S.]

Witnesses:
JOHN W. FARLEY,
F. M. BAILEY.